United States Patent [19]
Bewley

[11] 3,960,370
[45] June 1, 1976

[54] ELECTRIC FOOD MIXER SPATTER GUARD

[76] Inventor: Adele Lorraine Bewley, 399 Getzville Road, Amherst, N.Y. 14226

[22] Filed: Nov. 13, 1974

[21] Appl. No.: 507,579

[52] U.S. Cl. ............................ 259/118; 259/125; 259/DIG. 35
[51] Int. Cl.$^2$ ........................................... B01F 7/16
[58] Field of Search............ 259/DIG. 35, 121, 125, 259/116, 118, 119, 122, 123, 124, 103, 104

[56] References Cited
UNITED STATES PATENTS

| 844,906 | 2/1907 | Adams | 222/566 |
|---|---|---|---|
| 2,504,727 | 4/1950 | Post | 259/125 |
| 2,517,648 | 8/1950 | Franke | 259/119 |
| 2,858,118 | 10/1958 | Perkins | 259/125 |
| 3,318,583 | 5/1967 | Wright | 259/DIG. 35 |

*Primary Examiner*—Robert W. Jenkins
*Attorney, Agent, or Firm*—Allen J. Jaffe

[57] ABSTRACT

A spatter guard combined with a portable electric food mixer having a thin disc resting on the rim of a beater bowl, the undersurface of which contains a radial sieve extending from the center to the periphery thereof being sized to permit liquid to pass therethrough but to prevent solids from passing therethrough. The disc has a pair of openings for the reception of beater shafts each of which comprise a pair of opposed circular edges connected by linear edges to provide clearance for the beater shafts of the mixer.

1 Claim, 4 Drawing Figures

ELECTRIC FOOD MIXER SPATTER GUARD

This invention relates to a useful kitchen accessory, or aid, or more specifically, a cover, that can be adapted to the various available portable electric food mixers commonly found in many households, for the purpose of preventing splashing and spattering of ingredients, while the mixers are being used.

The principal object of the present invention is to eliminate annoying spattering and splashing of ingredients being mixed, which result in the need for extra kitchen clean-up chores, and often the soiling of wearing apparel.

Another object of the invention is to provide a safety factor to the mixing, beating, or whipping operations, when they are being conducted in an area where curious children are present.

A further object of the present invention is to introduce an effective barrier to accidental contamination of the ingredients being mixed.

This invention is in the form of an appropriately sized disk A, having elongated slots B, located on a pattern to match the beater shaft openings of any of the portable electric food mixers.

The disk can be made of any reasonably stiff, light, thin material, but preferably will be of transparent, or semi-transparent, plastic, approximately one-sixteenth inch thick. All surfaces of the disk will be free of scratches, or crevices, of any magnitude.

Figure 2:
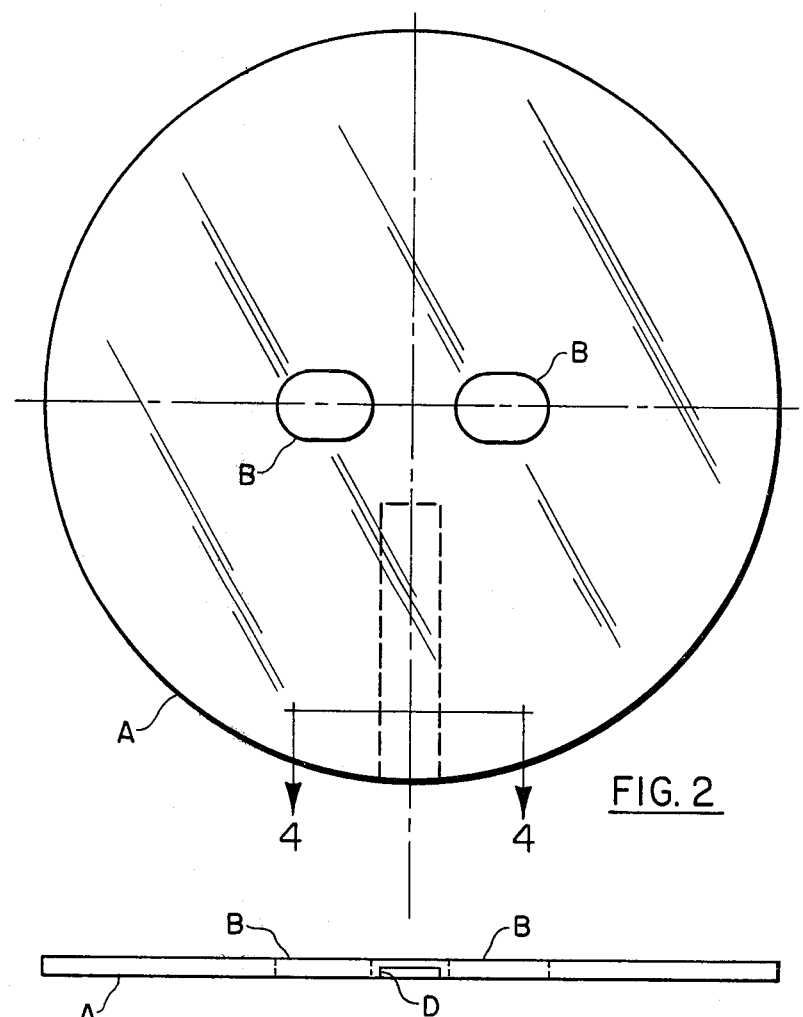
FIG. 2 is a top plan view thereof.
Figure 1:
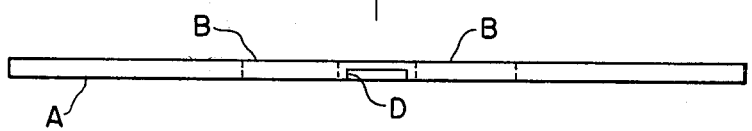
FIG. 1 is a front elevation of a disk embodying the present invention.
Figure 4:
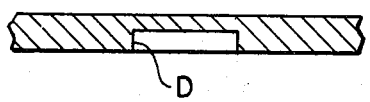
FIG. 4 is a sectioned view taken along line 4—4 of FIG. 1.
Figure 3:
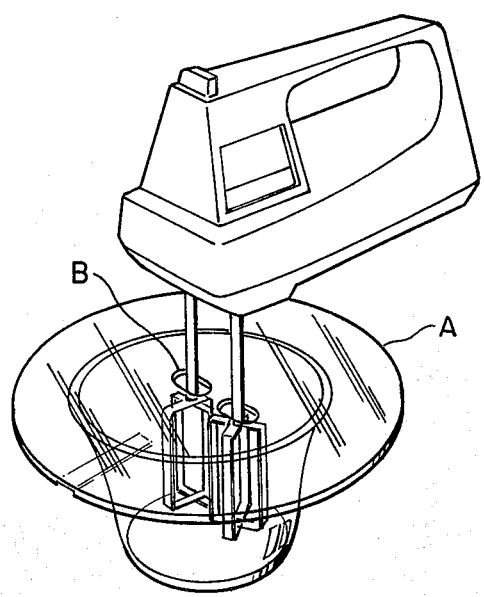
FIG. 3 is a sketch approximately depicting the present invention with a typical electric food mixer and mixing vessel.

The disc A has a bottom surface C which is adapted to rest on the mixing bowl. The bottom surface C is interrupted by a generally circumferential slot D, as indicated in FIG. 4, so as to provide a radial space or clearance between the rim of the bowl and the disc A to provide a sieve or pouring spout. The pouring spout permits liquids to be poured from the bowl while preventing unwanted bottom sludge or residue from being poured.

The Electric Food Mixer Spatter Guard selected by the individual about to use it, will have an outside diameter, approximately 2 inches greater than that of the mixing vessel, bowl or utensil.

In the use of the present invention, the beater shafts are first inserted through the elongated slots B, in the disk A, and then engaged in their respective openings in the body of the electric mixer. The beaters are lowered into the ingredients to be mixed, and the disc, or spatter guard, is then allowed to drop until it contacts and rests upon the top edge of the mixing vessel.

When the beating, mixing or whipping, cycle is begun, the splashes and spatters resulting are retained on the bottom side of the spatter guard, rather than being allowed to untidy the immediate environment as is invariably the case without the Guard.

From the foregoing it can readily be seen that the present invention provides a simple, but very effective, and welcomed, kitchen accessory, which will significantly lighten household tasks.

I claim:

1. A spatter guard in combination with a portable electric food mixer comprising;
   a. a portable electric food mixer having a pair of beaters connected thereto by a pair of beater shafts;
   b. a mixing bowl, independent of and unconnected to said portable mixer, having a rim,
   c. a generally circular thin disc having an upper and a lower surface, said lower surface resting on said rim,
   d. a pair of openings between said upper and lower surfaces with said shafts passing therethrough,
   e. each of said openings being defined by a pair of opposed circular edges connected by substantially linear edges to provide clearances for said beater shafts whereby the same can be easily moved with respect to said disc, and
   f. a radial sieve on said lower surface extending from the center to the periphery thereof, said sieve being so sized as to permit liquid to pass therethrough but to prevent solids from passing therethrough.

* * * * *